Figure 1:
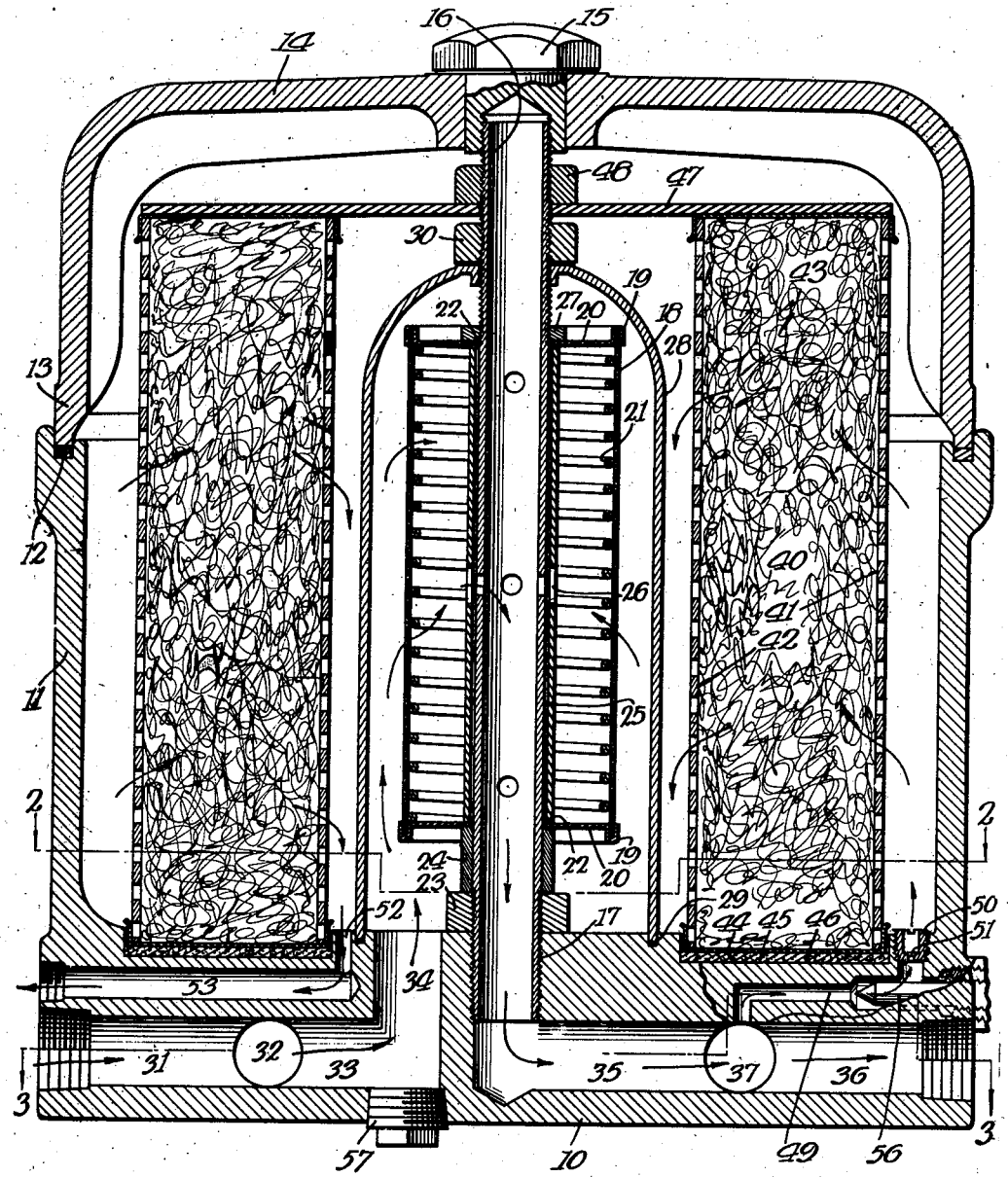

Aug. 26, 1941.   R. N. BURCKHALTER   2,253,686
FILTER
Filed May 14, 1938   2 Sheets-Sheet 1

Inventor:
Robert Nash Burckhalter
By Mann, Brown & Cox,
Attys.

Aug. 26, 1941.   R. N. BURCKHALTER   2,253,686
FILTER
Filed May 14, 1938   2 Sheets-Sheet 2

Fig.2

Fig.3

Inventor:
Robert Nash Burckhalter
By Mann, Brown & Cox,
Attys.

Patented Aug. 26, 1941

2,253,686

UNITED STATES PATENT OFFICE 2,253,686

FILTER

Robert Nash Burckhalter, Michigan City, Ind., assignor to Michiana Products Corporation, Michigan City, Ind., a corporation of Indiana Application May 14, 1938, Serial No. 207,894

4 Claims. (Cl. 210—131)

Lubricating oil for internal combustion engines is contaminated with solids that are injurious to bearings and impalpable solids such as colloidal carbon that will pass through the bearing clearances but discolor the oil. Solids of the first class—those injurious to bearings—can be removed by a filter element of such thinness and permeability that a small filter can pass the large quantity of oil required for force feed lubrication, but the removal of impalpable solids is best done by open fibrous material of considerable thickness through which the oil moves slowly under light pressure and such a filter for all the oil going to the bearings would be too large for practical use, especially on mobile equipment.

The principal object of this invention is to provide appropriately small compact apparatus for removing both types of solids. In the present embodiment this object is achieved by connecting a small primary filter, of the kind first mentioned, in series between the pump and the bearings and surrounding it with a relatively large secondary filter of the other kind that receives and filters a small portion of the oil that has passed through the first filter. By this means the bearings are at all times protected from injurious solids, the large open filter is protected from solids that would tend to clog it, and the impalpable solids are constantly filtered out at a rate sufficient to prevent objectionable color.

Other objects and advantages of the invention will be revealed as the disclosure proceeds and the description is read in connection with the accompanying drawings in which Fig. 1 is a vertical section through the filter apparatus, the passages being shown somewhat diagrammatical, and Figs. 2 and 3 are horizontal sections on the lines 2—2 and 3—3 respectively of Fig. 1.

But these particular drawings and the corresponding description are used for the purpose of disclosure only, and the great variety of forms of which the invention is susceptible are intended to be covered by the claims.

The base 10 of the apparatus is a casting having a cylindrical wall 11, grooved at its upper edge 12 to cooperate with the rim 13 of a cover 14, secured in place by a cap nut 15 and a perforated tube 16, threaded into a central opening 17 in the base, and forming the stem of the primary filter.

The primary filter element is preferably made according to the patent to Burckhalter, et al., No. 2,031,589, February 25, 1936. It consists of a barrel 18 of woven wire, the ends of which are gripped by the crimped edges 19 of heads 20. Between the heads the barrel is sustained against inward pressure by a stiff coil spring 21.

The heads have aligned central openings 22 to receive the tube 16, upon which the primary filter element is mounted. Near the lower end the tube 16 has a nut 23 above which is a spacer 24, having its upper end against the outside of the lower head 20. Between the two heads is a spacer 25, and openings 26 to permit free flow of oil through it to the perforated tube 16. A nut 27, screwed down against the outside of the upper head 20, serves to secure the primary filter element and associated parts on the tube 16 and make a sub-assembly.

The primary filter is inclosed by a drawn shell 28 seated in a groove 29 in the base, and secured by a nut 30 on the tube 16. Oil from the pump is delivered to one of two intersecting inlet ports 31 and 32, the other of which is plugged. A passage 33 connects the inlet ports with a vertical passage 34 leading into the primary filter chamber. The perforated tube 16 delivers to an outlet passage 35 which, in turn, delivers to intersecting outlet ports 36 and 37, one of which will be plugged when the other is in use.

The inlet port 32 and the outlet port 37 are connected by a by-pass 38, equipped with a spring pressed ball valve 39 to insure that the bearings will be supplied with oil even if the filter should be clogged.

From the foregoing it will be apparent that oil from the pump will be delivered to the primary filter chamber on the outside of the barrel filter element 18. It will flow through that element and into the perforated tube 16 from which it will escape to the outlet ports, and pass on to the bearings.

The secondary filter is an annular mass 40 of fibrous material between perforated cylinders 41 and 42, connected by ring-like heads 43 and 44. The head 44 rests upon a gasket 45 on annular seat 46 on the base 10, and the head 43 is held down by a disk 47, made fast by a nut 48 on the perforated tube 16.

The mass 40 may be shredded cotton or cotton waste, wool, a mixture of wool and cotton, or cattle hair and cotton, or cattle hair and asbestos fiber, or cotton and mineral wool, or various other materials, which, when put under slight pressure, make a mass somewhat springy while dry, but form an open permeable filter affording a great number of passages for oil and an infinite number of obstructions to impalpable solids. The mass should not be compacted or put under sufficient pressure of oil to make the colloidal carbon and the like collect at the surface. That material should actually enter the relatively thick fibrous bed and there be retained while the oil passes through and emerges practically clear.

In this particular embodiment oil is supplied to the secondary filter by a secondary outlet passage 49, connecting the outlet passage 37 with the inside of the large chamber formed by the wall 11 and the cover 14. The filter is protected from high pressure by a restriction fitting 50, having a bore 51 made with a 5/64" drill. The oil passes inwardly through the secondary filter and into the space surrounding the shell 28 from which it escapes by a vertical passage 52, leading to a secondary outlet port 53, connected with the sump or other reservoir for oil.

The flow of oil through the apparatus is controlled by three valves, 54, 55 and 56.

If the secondary filter is to be serviced the valve 56 is closed, thereby closing the passage 49, and after the oil in the large chamber has drained, the cover 14 and the disk 47 can be removed and the secondary filter serviced or replaced, while the primary filter continues to function.

If the primary filter is to be serviced the valves 54 and 55 are both closed. Pressure will then open the check valve 39 and the bearings will be served with the usual quantity of oil, while the primary filter is serviced. If it merely requires draining to remove accumulated solids, that can be accomplished by removing a drain plug 57, or the like, at the bottom of the base. Usually that is the only servicing that will be required, but should anything more extensive be deemed necessary, taking off the nut 30 and the shell 28 will expose the primary filter assembly, which can be removed as a whole and replaced as desired.

Some engineers will prefer primary filter elements of the type disclosed in the patent to Liddell, No. 2,042,537 of June 2, 1936, and the British patent to Gobbi, No. 30,303 of 1909. The use of such filters is contemplated in the combinations embodying this invention.

Almost every engineer will have some preference about the form or character of the secondary filter and the combination allows liberal choice in this respect. Oil for the secondary filter is here shown as being taken from the line after it has passed through the primary filter and that is preferable because it protects the restriction 51 from being clogged by the relatively large solid matter. However, that is not indispensible, and in some instances it may be found desirable to take the oil from some other point.

The apparatus is shown and described in connection with the internal combustion engine, but it is not intended to limit the invention to that use for obviously it will be of advantage with air compressors and other devices.

I claim as my invention:

1. In a lubricating system, a base member having a bottom wall provided with an inlet and a main outlet, said base member being provided with an upstanding side wall having a groove in its upper edge, an inverted cup-like cover member having its lower edge seated in said groove and forming with said base member an outer chamber, the bottom wall having an axial opening in communication with said main outlet, a perforated tube secured in said opening and extending upwardly axially of said side wall, an inner casing surrounding said tube, concentric with, and surrounded by said side wall, a primary filter within said casing, said inlet opening into said inner casing outwardly of said filter, a secondary filter surrounding said inner casing and spaced inwardly from said side wall, a discharge passage for said secondary filter, an intake passage for said secondary filter in communication with said main outlet and the space between said wall and secondary filter, means for admitting a portion only of the oil flowing through said primary filter to said secondary filter, and means engaging said tube for clamping said inner casing and said secondary filter against said base member.

2. In a lubricating system, a housing having bottom and side walls, intake and discharge passages in said bottom wall, an inner casing seated on said bottom wall and surrounding the inner open ends of said passages, a perforated threaded tube secured in one of said passages, a primary filter surrounding said tube, a second discharge passage in said bottom wall, a shunt oil passage in said bottom wall in communication with said discharge passage and having a restriction therein for admitting a portion only of the oil flowing through said primary filter, a secondary filter surrounding said primary filter casing within said housing, between said shunt and second discharge passages, a cover member seated on said housing for enclosing said filters whereby all of the oil of said system will pass through said primary filter for removing abrasive material and a portion only of the oil passing through the primary filter will be passed through the shunt passages, secondary filter and the second discharge outlet for removing impalpable impurities, and means engaging said cover and filters for holding the parts assembled, said means removably engaging said tube, whereby the parts may be readily removed from said housing by first removing said means.

3. In a lubricating system for an internal combustion engine having a crankcase for containing oil contaminated with impurities including solids injurious to bearings and impalpable solids such as colloidal carbon, a filtering apparatus including a base having therein an inlet for oil entering the apparatus and an outlet for oil flowing from the apparatus to parts to be lubricated, a primary filter including a casing carried by the base, and a primary filter element connected in series with said inlet and said outlet and between the same and excluding substantially all solids injurious to bearings and passing substantially all impalpable solids, a secondary filter including a casing carried by the base enclosing the primary filter, a secondary filter element within said last named casing surrounding the primary filter for removing colloidal carbon from the oil flowing therethrough, an intake passage for said secondary filter in communication with said outlet for oil from said primary filter for conducting oil therefrom to said secondary filter and an outlet passage in said base for conducting the oil from said secondary filter to said crankcase.

4. In a lubricating system for an internal combustion engine comprising bearings and a crankcase for containing oil contaminated with impurities including solids injurious to bearings and impalpable solids such as colloidal carbon, a filtering apparatus including a base, a relatively large secondary filter chamber supported thereon, a relatively small primary filter chamber within said relatively large secondary filter chamber, a primary filter element in the small chamber excluding substantially all solids injurious to bearings while passing substantially all impalpable solids, a secondary filter element in the large chamber surrounding the primary filter element for receiving oil from the primary filter and retaining substantially all colloidal carbon, an intake passage in said base for conducting oil to the primary filter element, a discharge conduit in said base for conducting filtered oil from the primary filter element to said bearings, a branch conduit for conducting oil from said discharge conduit to said secondary filter element and a discharge conduit in said base for conducting filtered oil from said secondary filter element to said crankcase whereby oil first passes through the primary filter and thereafter a portion only of that oil flows to the bearings and a portion only passes through the secondary filter and from the secondary filter element through an outlet in said apparatus, and means in said base cooperating with said connections for preventing circulation of oil through either of said filters without preventing the circulation of oil through the other.

ROBERT NASH BURCKHALTER.